E. R. LEONARD.
FUSIBLE LINK.
APPLICATION FILED JUNE 5, 1917.
1,262,362. Patented Apr. 9, 1918.
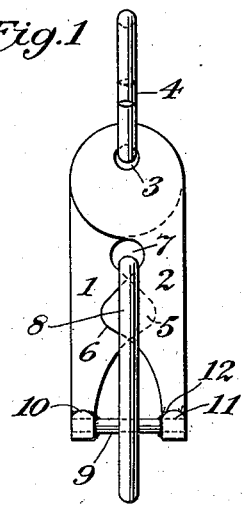
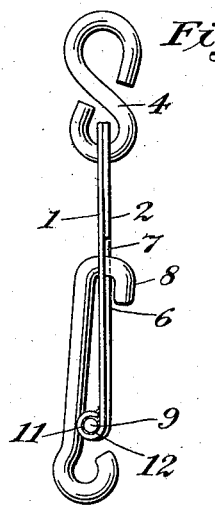
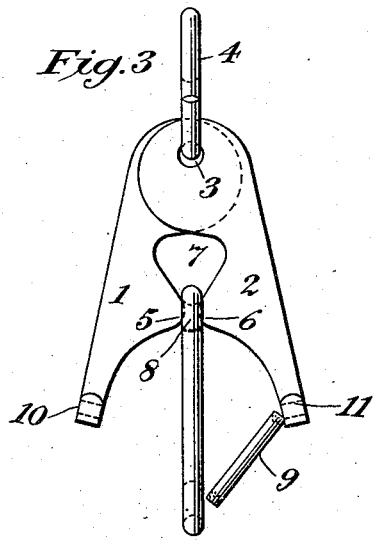
Inventor
Elof R. Leonard.
By his Attorney
Andrew Wilson.

UNITED STATES PATENT OFFICE.

ELOF R. LEONARD, OF WOODCLIFF, NEW JERSEY.

FUSIBLE LINK.

1,262,362.  Specification of Letters Patent.  Patented Apr. 9, 1918.

Application filed June 5, 1917. Serial No. 172,859.

*To all whom it may concern:*

Be it known that I, ELOF R. LEONARD, a citizen of the United States, residing at No. 209 Thirty-fourth street, Woodcliff, Bergen county, New Jersey, have invented certain new and useful Improvements in Fusible Links, of which the following is a specification.

My invention relates to links for chains, fastenings and the like, which are provided with elements adapted to fuse at a comparatively low temperature so as to allow the constituent parts of the link to separate and to thereby free the link itself from that to which it has been coupled, so as to automatically bring into operation safety devices, such as window closing means and the like, to prevent the spread of fire. And my present improvements are directed to novel forms of the releasable elements of the link and to the means whereby they are normally held in position.

In the drawings, in all the figures of which similar parts are designated by corresponding reference numerals, Figure 1 is a side view, and Fig. 2 is an edge view of one of my improved links in its normal or closed position, and Fig. 3 is a side view of the same in its releasing position.

The body of the link is formed of two similar elements 1 and 2 which are pierced near one end, as at 3 to receive a connecting element, as 4, which serves to hold the elements 1 and 2 in lateral relation and acts as a pivot for them.

These elements 1 and 2 are each provided with an extended point 5 or 6, which in the normal position of the parts overlap, as shown in Fig. 1, and form a hook-receiving opening 7, above them. The lower lines of this opening converge downwardly, so that when the hook 8 rests in the opening 7 its downward pressure will tend to press the elements 1 and 2 apart and to separate them. Normally this is prevented by a pin 9 which rests in sockets 10, 11 formed in the lower ends of the elements 1 and 2 by bending the same back around themselves.

In these sockets the pin 9 is secured by a solder 12, which will melt at a comparatively low temperature, but which at ordinary temperature will securely hold the elements 1 and 2 against being spread by the downward pull of the hook 8.

In operation, when the solder 12 is melted, the elements 1 and 2 will be spread apart by the downward drag of the hook 8 which will thereby be released, breaking the connection between the hook 8 and the link, while the elements 1 and 2 remain attached to the hook 4. This is desirable in certain uses to which the link may be put, for instance, to prevent the end of a chain to which it may be attached from sliding into an aperture through which the chain runs.

Having thus described my invention, what I claim and desire to secure by Letters Patent of the United States is,—

1. A fusible link embodying body elements overlapped and pivotally connected at one end and having their other ends separated, a transverse element connecting said separated ends and secured thereto by matter fusible at a comparatively low temperature, said body elements having portions coöperating to form a seat converging toward their separated ends and adapted to receive a holding element to exert longitudinal stress on the link.

2. A fusible link embodying body elements pivotally associated at one end and separated at the other end and having intermediate and relatively opposed cam surfaces, a transverse, connecting element between the separated ends and releasable therefrom by a comparatively low degree of heat, and means supported between said cam surfaces and adapted to exert longitudinal stress on the link, transversely of the end connecting element, and to be released by the spreading of the separated ends.

ELOF R. LEONARD.

Witness:
 AGNES SCHAEFER.

Copies of this patent may be obtained for five cents each, by addressing the "Commissioner of Patents, Washington, D. C."